United States Patent [19]

Dieckhoff

[11] Patent Number: 4,549,798
[45] Date of Patent: Oct. 29, 1985

[54] APPARATUS HAVING A PICTURE SCREEN FOR THE DISPLAY OF PICTURE SEQUENCES

[76] Inventor: Rolf Dieckhoff, Marienstrasse 26, D-7050 Waiblingen, Fed. Rep. of Germany

[21] Appl. No.: 516,771

[22] Filed: Jul. 25, 1983

[30] Foreign Application Priority Data

Jul. 26, 1982 [DE] Fed. Rep. of Germany ... 8221237[U]

[51] Int. Cl.⁴ ............................................. G03B 21/22
[52] U.S. Cl. ....................................... 353/72; 353/78; 353/79; 353/119
[58] Field of Search ................. 353/77, 78, 79, 72–76, 353/119

[56] References Cited

U.S. PATENT DOCUMENTS 2,174,778  10/1939  Croft ...................................... 353/78
3,744,893  7/1973  Chandler ............................... 353/75

FOREIGN PATENT DOCUMENTS 1542455  9/1968  France ................................... 353/78
  93272  1/1969  France ................................... 353/78

Primary Examiner—Harry N. Haroian
Attorney, Agent, or Firm—Harness, Dickey & Pierce

[57] ABSTRACT

A collapsible display is provided for the projection of visual images. The device according to this invention is a display apparatus which is collapsible from an operating condition to a compact storage condition. In use, the device provides a housing for a projector and includes an internal projection screen. Collapsibility is achieved by providing a number of hinged panels which are stacked in the storage condition but deployed to define the surfaces of the projection device when in use. This display device is easily transported and stored when not in use.

3 Claims, 5 Drawing Figures

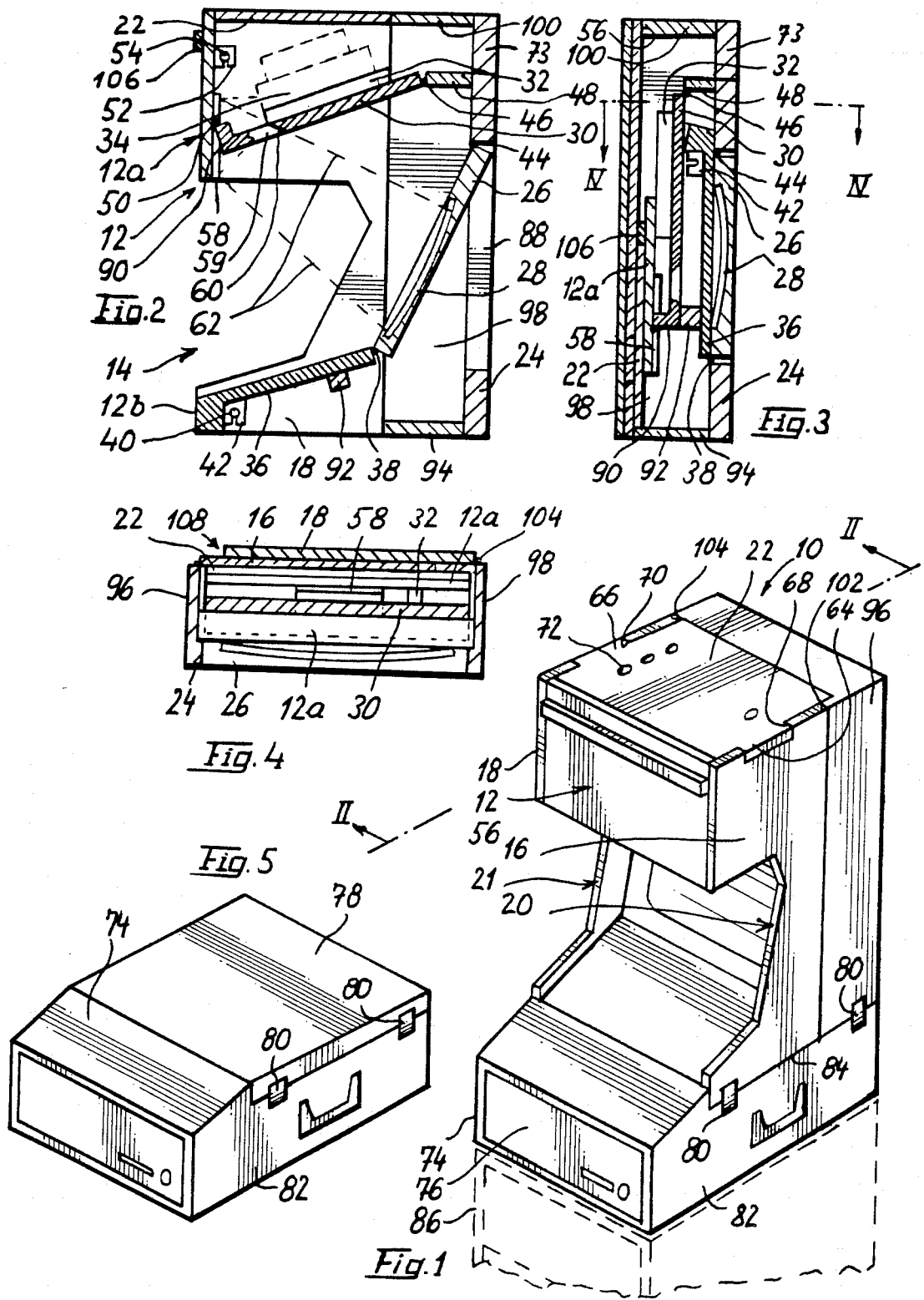

APPARATUS HAVING A PICTURE SCREEN FOR THE DISPLAY OF PICTURE SEQUENCES

The present invention is with respect to an apparatus for the projection of trains or sequences of pictures on a picture screen forming part of the apparatus, which has a support structure for the projection means.

Such apparatus is more specially used in connection with audiovisual information systems, that is to say not only stationarily, but frequently at different places, as for example for teaching and education and for advertising, at trade exhibitions, for letting people see new products and the like so that the fact that, because its size, such apparatus as so far in existence is hard to take round from one place to another; in any event the size of the apparatus is such that transport is not possible without having a vehicle desinged for sizable loads.

The purpose of the invention is that of so designing an apparatus of the sort noted hereinbefore that while on the one hand it may be used as a full audiovisual information apparatus, it may be simply transported and is handy in this respect, so that such transport is possible with a private automobile or even using public transport.

For effecting this purpose the support structure is made up of elements that may be moved in relaton to each other between a projection position and a transport position and may be locked in the two positions in relation to each other, and in the projection position the support structure has the effect of positioning the projection means in keeping with the fixed optical ray path desired, whereas in the transport position the elements are right next to each other.

Because even for reasons in connection with upkeep the projector may be readily taken out of the apparatus, after this has been done the apparatus may be folded up as a handy and readily transported unit. In keeping with a more specially preferred form of the invention the apparatus has a case-like base, that is to say a base like a suitcase or the like, with a rest against which the elements (that are put together in the form of a housing in their projection position), possibly with the addition of at least one further element if need be, may be placed. The projector, taken from the support structure, may then be put in this case, which furthermore may have a loudspeaker and control unit and possibly transparency magazines if needed in it, so that all parts, as needed for an event in which audiovisual apparatus is used, will be ready for use and on hand in the form of two readily transported units, that may be put together for projection to make up a single complete unit or structure.

A number of further useful forms of the invention of value are detailed in the dependent claims, in connection with the account hereinafter.

This account is based on a working example of the invention.

FIG. 1 is a perspective view of an apparatus in keeping with the invention having a case-like base.

FIG. 2 is a section of the line II—II of FIG. 1 without the base viewed in FIG. 1.

FIG. 2 is a view on the same lines as FIG. 2 taken through the apparatus in the transport condition thereof.

FIG. 4 is a section taken on the line IV—IV of FIG. 3.

FIG. 5 is a perspective view of the base that is made like a carrying case.

The apparatus in keeping with the present invention has a housing generally numbered 10, that, when put into its projection position, may be thought of a fitting within an upright rectangle. The end wall 12 of the housing 10 has a window cutout 14 stretching over its full width, such cutout running into the two side wall 16 and 18 in the form of further cutouts 20 and 21 stretching over about half the depth of the housing. At the top the housing 10 is walled off by a cover 22 and to the back it is walled off by a back wall 24.

In the inside of the housing 10, in the projection position (see FIG. 2) there are supports 26, sloping upwards towards the back wall 24, for a projection screen 28, placed opposite to the window cutout 14, and over the window cutout 14, for a projector shelf 30. The shelf sloping upwards at a lesser slope that the carrier 26 towards the back wall 24 and being designed to take up a projector of some known design. Dependent on the sort of projector used, there is a stop rail 32 placed on the top side of the projector shelf 30, such rail making possible adjustment into the optically right position of the projector 34 (that is marked in full lines in FIG. 2 and is not a part of the structure in keeping with the present invention) after changing over the apparatus out of the transport position into the projection one, as will become clear later.

As will be clearly seen from FIG. 2, the end wall 12 of the apparatus is formed by two sections 12a and 12b, that are made separate from each other, and of which the section 12a is positioned over the window cutout 14, whereas the section 12b is placed under the window cutout 14 that is in the form of supporting foot on a cover plate 36, said plate forming the lower limit of the inner space, able to be looked into by the user, of the apparatus between the window cutout 14 and the projection screen 28 or its support 26. In the projection position the covering plate 36 is placed sloping backwards towards the back wall and is used at the same time for optically truing up the projection screen 28, with whose support 26 is it joined up by way of a hinge joint 38 with a level pin that is parallel to the back wall 24. On the two side walls 16 and 18 and on the cover plate 36 there are locking elements 40 and 42 designed for functioning with each other so that they may be positively locked together, the locking elements 40 placed on the side walls 16 and 18 having the form of bolts with heads, whereas the locking elements 42 on the cover plate 36 have the form of slotted bars that may be pushed over the stems of the bolts 40. Because the support 26 is fixed by a further hinge joint 44 (whose axis is parallel to the hinge joint 38) on the back wall 24, the locking of the cover plate 36 on the side walls 16 and 18 in the projection position has the effect of adjusting the position of the projection screen.

In much the same way the projector shelf 30 is joind up by way of a hinge joint 46 with a level axis parallel to the back wall 24 to a rail 48 that for its part is fixedly joined to the back wall 24, such rail running out into the inside space of the housing 10. The projector shelf is furthermore at its edge nearest to the end wall 12 joined with the section 12a of the end wall 12 by way of a hinge joint 50 having a hinge axis parallel to the hinge joint 46. In order to make this clearer, in FIGS. 2 and 3 the front part or section of the shelf 30 is not marked in section with the section 12a but in side view after the side wall 16 has been taken off. At its two sides the section 12a of the end wall 12 has locking elements 52 answering to the slotted bars 42, the same having locking elements 54 answering to the pins 40, on the side wall 16 and 18. These locking elements 52 and 54 are placed at a lower level than the cover 22. Because the inner face of the section 12a of the end wall 12 is on the edge 56, placed nearest to it, of the cover 22, the section 12a is kept exactly in the desired position, so that furthermore the position of the shelf 30 and for this reason the slope of the optic axis of the projector 34 seated on the shelf 30 is positioned.

In the ray path of the projector 36 and on the inner face of the section 12a of the end wall 12 there is a mirror 58, same making it necessary for the side, nearest this section 12a, of the shelf 30 to have a cutout 59, that at its limit nearest to the hinge joint 46 has a sloping part 60 so as not to be in the way of the path 62 of the rays as marked in broken lines.

The cover 22 is loosely seated in the housing 10 in such a way that its top face is in line with the top edges of the end wall 12, of the side walls 16 and 18 and of the back wall 24. In order to keep the cover 22 in this position, its has heads 64 and 66 on its sides for locking positively into cutouts 68 and 70 therefor in the side walls 16 and 18, as the reader will see from FIG. 1. The ventilation of the projector is by way of air inlet openings 72 in the cover 22, air being let off by way of an opening 73 into the back wall 24 over the rail 48.

Although in the condition as noted so far the apparatus is completely ready for operation, it is useful, not only in view of making the apparatus simpler in use but furthermore to make the design more tasteful, to have a base 74 matching the lower face of the housing 10, that at the time of transport make take up the projector 34 that is then taken out of the housing 10. It is furthermore possible for transparency magazines and a professional control unit to be housed in the base 74, the control unit being kept in the base 74 when the projector is being used. There may be a loudspeaker in the end wall 76 of the base 74.

The base 74 is like a valise or suitcase in design and its cover 78 may be taken off. The cover may be joined with the box part 82 of the base 74 by way of spring tightening fittings 80 of known design. After taking off the cover 78 it is then possible to put on the lower edge 84 (that is then freed) of the base opening, the lower edge being formed by the end wall section 12b, the side walls 16 and 18 and the back wall 24, of the housing 10 so that the different parts are put together in harmony with each other as a single unit, as will be clearly seen from FIG. 1.

In order to make it possible for the apparatus to be positioned on the floor its is possible to have a cupboard-like stand 86 with a top part matching the plan outline of the base 74.

On the housing 10 it is possible to have fittings designed for use with the tightening fittings 80 in order to keep the housing 10 firmly on the base 74 in the projection position.

When the apparatus is to be put into its condition ready for transport, the cover 22 is firstly taken off and the projector 34 is taken from the housing 10. Furthermore the connection between the housing 10 and the base 74 is undone and the housing 10 is taken from the base 74, whereupon the projector 34 is placed in the base 74.

Nextly, by lifting up the cover plate 36 the connection between the locking elements 40 and 42 is undone and then the support 26 is rocked into an upright position. The back wall is best made with a cutout 88 to take up the support 26 so that same may then be lowered into the back wall 24. The cover plate 36 is rocked upwards till it as well is in an upright position in which it is resting against the support 26. By lifting up the section 12a of the end wall 12 the locking elements 52 and 53 are unjoined, whereupon the section 12a is lowered. For this reason the projector shelf 30 is placed against the foot of the section 12b on the cover plate 36, when the shelf has been put in an upright position, because in the transport position the size of the section 12b, measured on the level, is equal to the size of the rail 48 as so measured or the distance between the hinge joint 46 from the inner face of the back wall 24. At the same time the section 12a is rocked into an upright position so that the mirror 58 is facing the back wall 24. The inner face of the section 12a is then rested against the top side of the stop rail 32. The height of the stop rail 32 and the height of the heads 90 on the side supported the hinge joint 50, of the shelf is made so that the it is the same as the breadth, as measured on the level, of the bars 52 in the projection position, the bars then being in the transport position between the shelf 30 and the section 12a. If the bars 52 are broader than this, the side edge of the shelf may have a hollow designed to take up the bars 52 or the shelf 30 may be made somewhat narrower.

To make certain that the forces acting on the hinge joint 46 are not overgreat, on the underside of the cover plate 36 there is a rail 92, which in the transport position (see FIG. 3) is on the side nearest the shelf 30 so that the shelf 30 is supported thereby in addition to being supported on the section 12b.

The cover 22, as taken off, is then placed on the section 12a so than it may be seated on a rest 94 on the floor thereof running inwards from the back wall 24 at its lower end on the level inwards so far that the cover, resting against the section 12a in the transport position, comes to an end in line with the edge, furthest from the back wall 24, of the rest 94 at the floor. Rests with 96 and 98 with a like function are furthermore present running out past the limits of, and in line with, the side walls 16 and 18 and such a rest 100 is furthermore placed in line with the cover 22 and joined with the back wall 24, the rests 98 and 100 as measured in a direction normal to the back wall 24 being of the same size as the floor rest 94, whereas the rest 96 is longer by an amount equal to the thickness of the side wall 16.

The side walls 16 and 18, that may be rocked about hinge joints 102 and 104, as the case may be, towards the space inside the housing 10, are joined with the rests 96 and 98, and on moving the parts into the transport position it is firstly the side wall 18 that is rocked inwards about the joint 104 to come to rest on the cover, whereafter the side wall 16 is rocked and placed on the side wall 18. For stopping the cover 22 slipping out of its position, it is possible for a stop rail to be formed on or fixed to the outer face of the section 12a of the end wall 12, such rail being able to be seen in FIGS. 2 and 3, wherein it is numbered 106, or nosepieces in line with such means may be formed on the inner face of the side wall 18 or the stop rail 32.

After inward rocking of the side wall 16 the housing 10 will be in its transport position. By the use of some sort of locking means or fastener, not viewed in the figures, and placed in the part marked 108 in FIG. 4, between the two side walls 16 and 18, or in the form of a band running right the way round the shut housing, or the like, the housing is able to be locked in its case-like folded-up condition. After undoing such fastener the apparatus may be changed over into the projection position quite as readily.

I claim:

1. A portable apparatus which is collapsible from an operating condition to a storage condition for projecting images from a self-contained projector to a self-contained screen comprising;

a box-shaped section having a back wall with a first cutout therein, a pair of projecting side rests and a pair of projecting end rests, a pair of side walls attached to said side rests by first hinges such that said side walls lie substantially in the same plane as said side rests when said apparatus is in said operating condition and foldable to a position substantially perpendicular to said side rests in said storage condition, said side walls having second cutouts, a projection screen attached by third hinges to said back wall, said projection screen adapted to display images from said projector, said projection screen lying within said first cutout when said apparatus is in said storage condition, a cover plate attached to fourth hinges to said projection screen, a rail connected to said back wall, a projector shelf attached by fifth hinges to said rail, said shelf adapted to position said projector, said shelf having a third cutout, an end wall removably attachable to said side walls when said apparatus is in said operating condition, said side wall further supporting said projection shelf when said apparatus is in said operating condition, a mirror attached to said end wall for reflecting an image from said projector through said third cutout and onto said screen, said apparatus characterized in that said side walls, projecting screen, projector shelf, and end walls are collapsible to fit within said box section such that said side walls, projection screen, projection shelf, and end walls lie in stacked parallel planes when said apparatus is in said storage condition.

2. A portable apparatus according to claim 1 further comprising a case-like base having a support on which said apparatus may be mounted.

3. A portable apparatus according to claim 2 further comprising fixing means for attaching said apparatus to said case.

* * * * *

UNITED STATES PATENT AND TRADEMARK OFFICE
CERTIFICATE OF CORRECTION

PATENT NO. : 4,549,798

DATED : October 29, 1985

INVENTOR(S) : Rolf Dieckhoff

It is certified that error appears in the above-identified patent and that said Letters Patent is hereby corrected as shown below:

Column 1, line 18; "desinged" should be --designed--

Column 1, line 27; "relaton" should be --relation--

Column 1, line 62; "Fig. 2" (first occurrence in patent) should be --Fig. 3--

Column 2, line 40; "is it" should be --it is--

Column 2, line 55; "joind" should be --joined--

Column 3, line 21; "its" should be --it--

Column 3, line 32; "make" should be --may--

Column 3, line 51; "its" should be --it--

Column 4, line 18; "supported" should be --supporting--

Column 4, line 19; "the" (second occurrence) should be deleted

Column 4, line 24; "designed" should be --design--

Signed and Sealed this

Twenty-fifth Day of March 1986

[SEAL]

Attest:

DONALD J. QUIGG

Attesting Officer

Commissioner of Patents and Trademarks